(12) United States Patent
Schneider et al.

(10) Patent No.: US 7,302,940 B2
(45) Date of Patent: Dec. 4, 2007

(54) VARIABLE RELUCTANCE POSITION SENSOR

(75) Inventors: Matthew L. Schneider, Seymour, IN (US); Alfred Schuppe, Columbus, IN (US)

(73) Assignee: Cummins, Inc, Columbus, IN (US)

( * ) Notice: Subject to any disclaimer, the term of this patent is extended or adjusted under 35 U.S.C. 154(b) by 239 days.

(21) Appl. No.: 11/234,905

(22) Filed: Sep. 26, 2005

(65) Prior Publication Data

US 2007/0068499 A1 Mar. 29, 2007

(51) Int. Cl.
F02M 25/07 (2006.01)
F02B 47/08 (2006.01)
G01B 7/14 (2006.01)
H01L 43/08 (2006.01)

(52) U.S. Cl. .................. 123/568.21; 324/207.21; 324/207.24

(58) Field of Classification Search ........... 123/568.11, 123/568.16, 568.21–568.28; 251/129.15, 251/129.16; 324/207.2–207.26; 73/117.3, 73/118.2
See application file for complete search history.

(56) References Cited

U.S. PATENT DOCUMENTS

| | | | | |
|---|---|---|---|---|
| 3,855,525 A * | 12/1974 | Bernin | | 324/207.19 |
| 5,570,015 A | 10/1996 | Takaishi et al. | | 324/207.21 |
| 5,955,881 A | 9/1999 | White et al. | | 324/207.2 |
| 6,018,241 A | 1/2000 | White et al. | | 324/207.2 |
| 6,107,793 A * | 8/2000 | Yokotani et al. | | 324/207.21 |
| 6,178,956 B1 | 1/2001 | Steinmann et al. | | 123/568.21 |
| 6,194,893 B1 * | 2/2001 | Yokotani et al. | | 324/207.21 |
| 6,253,749 B1 | 7/2001 | Kotwicki et al. | | 123/568.27 |
| 6,374,814 B1 | 4/2002 | Cook et al. | | 123/258.21 |
| 6,382,195 B1 * | 5/2002 | Green et al. | | 123/568.23 |
| 6,411,081 B1 | 6/2002 | Spellman | | 324/207.21 |
| 6,415,776 B1 * | 7/2002 | Gates et al. | | 123/568.24 |
| 6,448,763 B1 | 9/2002 | Spellman | | 324/207.21 |
| 6,565,064 B2 | 5/2003 | Smith et al. | | 251/129.04 |
| 6,690,158 B2 | 2/2004 | Saito et al. | | 324/207.21 |
| 6,698,408 B2 | 3/2004 | McConnell | | 123/568.21 |
| 6,753,680 B2 | 6/2004 | Wolf | | 324/207.2 |
| 6,847,205 B2 * | 1/2005 | Puech | | 324/207.25 |
| 6,873,150 B2 * | 3/2005 | Buerger et al. | | 324/207.2 |
| 7,124,750 B2 * | 10/2006 | Tsokonas | | 123/568.21 |
| 2002/0089327 A1 | 7/2002 | Spellman | | 324/207.21 |
| 2002/0118011 A1 | 8/2002 | Wolf | | 324/207.2 |
| 2003/0094941 A1 | 5/2003 | Mizutani et al. | | 324/207.2 |

* cited by examiner

Primary Examiner—Willis R. Wolfe, Jr.
(74) Attorney, Agent, or Firm—Kunzler & McKenzie (57) ABSTRACT

A position sensor is disclosed having a transducer formed by a Hall-effect device and permanent magnet secured within a housing on either side of a low permeability gap. A target secured to an active member, such as an EGR valve plunger moves within the gap. The target has a flux modulating property that varies with position along a direction of travel. In one embodiment, the reluctance of the target varies with position. Variable reluctance is achieved in some embodiments by varying the cross section of the target with position. In some embodiments, a second target having substantially constant reluctance secures to the active member and moves within a gap defined by a second transducer. The output of the second transducer is used to normalize the output of the first transducer and compensate for anomalies such as drift and movement other than in the direction of travel of the active member.

25 Claims, 6 Drawing Sheets

VARIABLE RELUCTANCE POSITION SENSOR

BACKGROUND OF THE INVENTION

1. Field of the Invention

This invention relates generally to position sensors incorporating Hall-effect devices and more particularly to systems for tracking the position of EGR valve plungers.

2. Description of the Related Art

Exhaust gas recirculation (EGR) valves are used to improve the performance of automobile engines by reducing the temperature within the cylinders during combustion and by preventing pre-ignition. At high temperatures, nitrous oxides ($NO_x$), a pollutant, tend to form. Also at high temperatures, the fuel air mixture within the cylinder tends to pre-ignite in the absence of a spark during the compression stroke, rather than during the combustion stroke.

To reduce the temperature within the cylinder, the EGR valve permits small amounts of inert gas from the exhaust system to enter the cylinder during the intake stroke. The EGR valve typically has a plunger whose position determines the amount of exhaust gas permitted to reenter the cylinder. In some systems the plunger is coupled to a diaphragm that is controlled by vacuum from the intake manifold. In others, the plunger is controlled electronically by a solenoid or stepper motor. Pneumatic or hydraulic control may also be used.

The EGR valve typically remains closed while the engine is cold or at idle and remains open once the engine has warmed up and is running at part-throttle. Where the EGR valve fails to open properly, $NO_x$ emissions increase and pre-ignition may result. If the EGR fails to close properly, rough idling, hesitation, and stalling may occur.

In many systems, an emissions control module (ECM) or other onboard computer monitors the EGR valve to ensure proper functioning. In systems with solenoid or stepper motor driven EGR valves, the ECM or onboard computer controls the position of the plunger of the EGR valve.

It is important that the position of the plunger be measured with precision in order to provide accurate information to the ECM of a vehicle. Some positions sensors use a Hall-effect device which measures changes in the magnetic field incident thereon. In some systems, the Hall-effect device moves relative to a stationary permanent magnet or magnets to vary the magnetic field incident on the Hall-effect device with position. In others, one or more permanent magnets move relative to a stationary Hall-effect device. In either case, in such systems, the device involves two distinct parts that move independently.

Such systems are inconvenient to service. The Hall-effect device and permanent magnet are both affected by the harsh environment of an automobile engine compartment. The Hall-effect device is typically formed in silicon chips which are prone to failure at high temperatures. A typical iron based ferromagnetic material will lose its permanent magnetism at approximately 1400° F., which is the temperature of the exhaust gases of an internal combustion engine under heavy operating conditions.

Inasmuch as either of these parts may fail, they ought to be readily accessible for replacement. However, separate mounting of the permanent magnet and Hall-effect device requires the replacement of two parts. Furthermore, it is difficult to precisely position the permanent magnet with respect to the Hall-effect device inasmuch as they are mounted to distinct structures, one of which is movable. Accordingly, replacement of either the magnet or the Hall-effect device requires recalibration of the position sensor.

It would therefore be an advancement in the art to provide an EGR position sensor integrating the permanent magnet and Hall-effect device into a single unit and providing for convenient servicing and calibration.

SUMMARY OF THE INVENTION

The present invention has been developed in response to the present state of the art, and in particular, in response to the problems and needs in the art that have not yet been fully solved by currently available EGR sensors. Accordingly, the present invention has been developed to provide an improved sensing apparatus and method that overcome many or all of the above-discussed shortcomings in the art.

In one embodiment of the invention, a target secures to an active member whose movement along a direction of travel is to be measured. The direction of travel may be translational or rotary. The target modulates magnetic flux across a gap between a flux source, such as a permanent magnet, and a magnetic field sensor, such as a Hall-effect device.

The target is configured with a flux modulating property that varies with position along the target such that the amount of flux crossing the gap facilitates identification of the portion of the target positioned over or in the gap. In one embodiment, the flux modulating property is the reluctance of the target. Variation in reluctance may be accomplished by constructing the target of a high-permeability material and varying the cross-section of the target proportionately with position along the direction of travel of the target. In one embodiment, only the distance the target protrudes into the gap is varied whereas the width of the target is not. In some embodiments a flux concentrator extends from the permanent magnet, around the gap, to the Hall-effect device to promote the flow of magnetic flux.

In some embodiments, a second target having a constant flux modulating property, such as reluctance, may move within a second gap having a second magnetic field sensor. The second magnetic field sensor may detect flux from the same magnetic flux source as the first magnetic field sensor, or an additional flux source may be used. The output of the second magnetic field sensor may be used to normalize the output of the first magnetic field to reduce noise and other anomalies. Inasmuch as variations in the output of the second magnetic field sensor can be attributed to anomalies such as movement other than in a direction of travel, drift, and the like, the output of the second provides a measure for offsetting the contribution of such anomalies to the output of the first magnetic field sensor.

The present invention provides advantages over the prior art. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Figure 1:
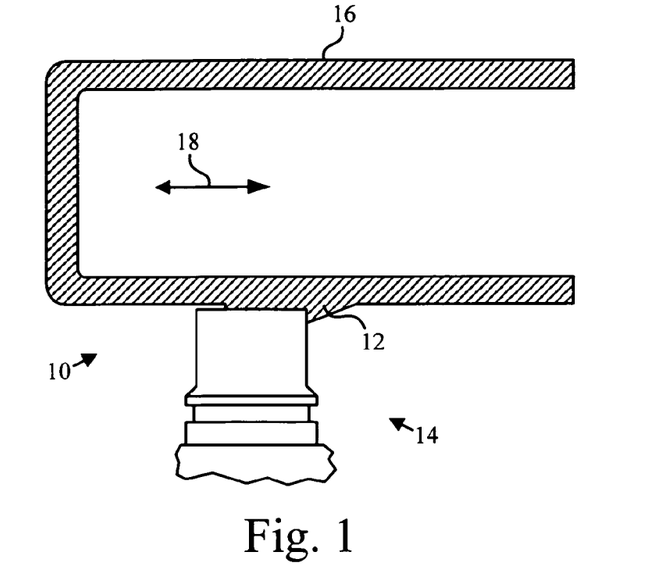
FIG. 1 is a side view of a target and sensor, in accordance with the present invention.

Referring to FIG. 1, a position sensor 10 may include a target 12 and a transducer 14. The target may mount to an active member 16, such as the plunger of an EGR valve, whose position is being measured. The active member 16 typically has at least one direction of travel 18, which is translational in the embodiment of FIG. 1. The transducer 14 typically mounts to a stationary member such as an automobile body, an engine structure, or an EGR valve housing. The transducer 14 may also be mounted to a bracket that is secured to a stationary member.

Figure 2:
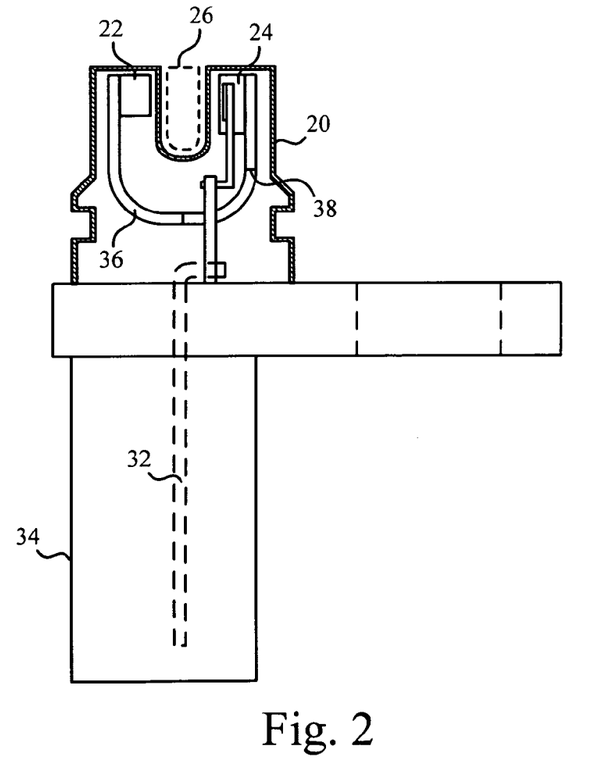
FIG. 2 is a cutaway view of a sensor, in accordance with the present invention.

Referring to FIG. 2, the transducer 14 may include a housing 20, a flux source 22, and a field sensing device 24. The flux source 22 and field sensing device 24 are secured to the housing 20 such that a gap 26 exists between them. In some embodiments, the housing 20 surrounds the flux source 22 and field sensing device 24 and is made of a material that has low interaction with magnetic fields such as a high-temperature plastic, ceramic, or a nonferromagnetic metal such as aluminum. In others, the flux source 22 and field sensing device 24 are exposed.

The flux source 22 may be embodied as a permanent magnet or as an electromagnet maintained at substantially constant or predictable magnetic flux. A flux sensing device 24 may be embodied as a Hall-effect device. Alternatively, other magnetic-field sensors, such as spinvalve transistors based on the giant magnetoresistance (GMR) of magnetic multilayers, may be used to detect the magnetic field from the flux source 22. Wiring 32 couples to the field sensing device 24 and provides ground, power, and output lines. An integral connector 34 secured to the housing 20 or to the frame of the automobile proximate the housing may secure to a wiring harness or the like. Alternatively, a pigtail cable may be used.

In some embodiments, a flux concentrator 36 extends from the field sensing device 24, around the gap 26, to the flux source 22. The flux concentrator 36 is typically made of a magnetically permeable material, such as magnetically soft iron. The flux concentrator 36 may serve to intensify the magnetic flux incident on the field sensing device 24. In some embodiments, an aperture 38 or groove 38 is formed in the flux concentrator 36 to accommodate the wiring 30.

Figures 3, 4, 5:
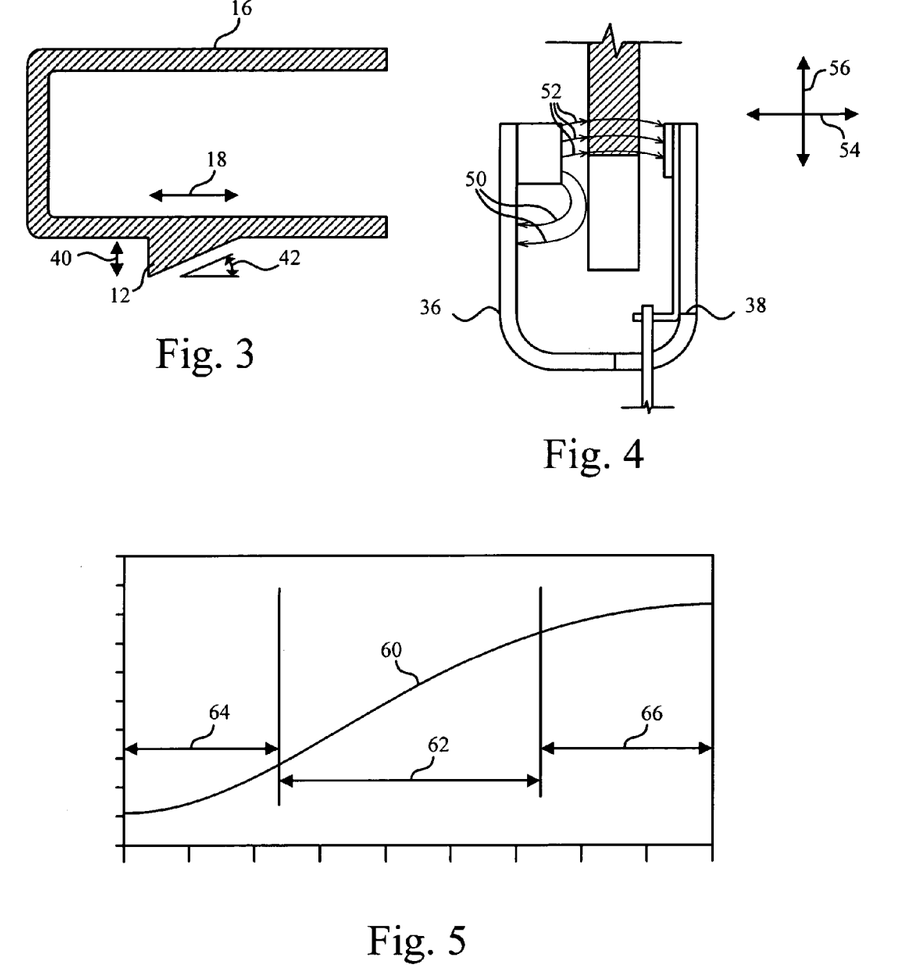
FIG. 3 is side cross sectional view of a target, in accordance with the present invention.
FIG. 4 is a top view of a schematic representation of a sensor and target having a graphical representation of magnetic flux patterns, in accordance with the present invention.
FIG. 5 is a graph representing the output of the sensor, in accordance with the present invention.

Referring to FIG. 3, the target 12 typically has a flux modulating property that varies along the direction of travel 18. In the illustrated embodiment, the flux modulating property is the reluctance of the portion of the target 12 positioned within the gap 26. The reluctance may be varied by altering the cross section of the target 12 with position along the direction of travel, such that more or less material is positioned within the gap 26 depending on the position of the target 12. In the illustrated embodiment, the height 40 of the target is varied. In other embodiments, the thickness is varied with position. In still other embodiments, the reluctance of the material constituting the target may vary with position. In still other embodiments, two or more of thickness, height, and reluctance may be varied with position. In the illustrated embodiment, the target 12 has a slope 42 such that the amount of material within the gap 24 will vary linearly as the target 12 moves along the direction of travel 18 at constant speed.

Referring to FIG. 4, in operation the magnetic flux from the flux source 22 will follow the paths 50 in the absence of the target 12. However, as the target 12 moves into the gap 26, the reluctance across the gap 26 is reduced. Accordingly, flux will be directed along paths 52 through the target 12 and be incident on the field sensing device 24. Additionally, the target 12 may comprise a soft magnetic material that in certain situations increases the total flux flowing out of the flux source 22. Thus, the greater the amount of material positioned within the gap 26, the greater will be the amount of flux paths 52 incident on the field sensing device 24.

In order to accurately sense variations in the magnetic field, variations in directions 54, 56 orthogonal to the direction of travel 18 may need to be reduced or compensated for. In some embodiments, the active member 16 may be constrained to travel only in the direction of travel 18. Where variation in direction 54 occurs the reluctance across the gap 26 is no longer varied only by the amount of material positioned within the gap 26. The reluctance across the air gaps is proportional to the inverse of the length of the air gaps. Accordingly, as the air gaps on either side of the target 12 are varied, nonlinear variation of the reluctance occurs. As variation in the direction 56 occurs, the amount of material in the gap 26 no longer reflects variation along the direction of travel 18 as determined by the slope 42 of the target 12, but rather by both the slope 42 and variation in the direction 56.

Referring to FIG. 5, the output of the transducer 14 as the target 12 is moved at constant speed is represented by the curve 60. Although the curve 60 is not a linear, portion 62 thereof is substantially linear and the end portions 64,66 do not vary significantly from a linear shape. In some embodiments, the range of motion of the active member 16 may be limited to the linear portion 62. Alternatively, calibration and digital processing may be used to compensate for nonlinear portions 64, 66.

Figure 6:
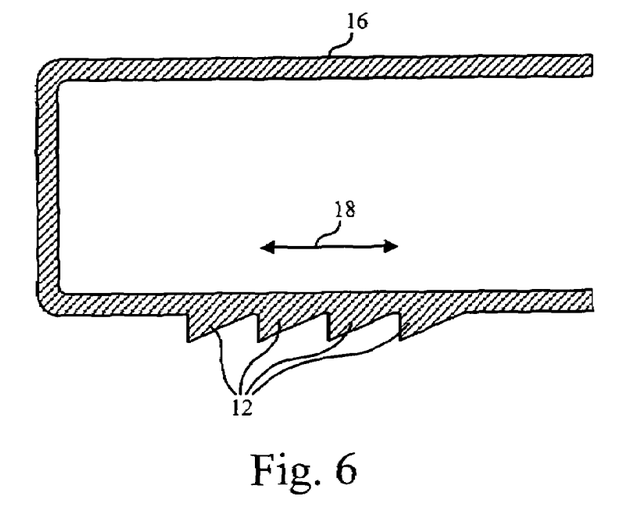
FIG. 6 is a side cross sectional view of an alternative embodiment of a target, in accordance with the present invention.
Figure 7:
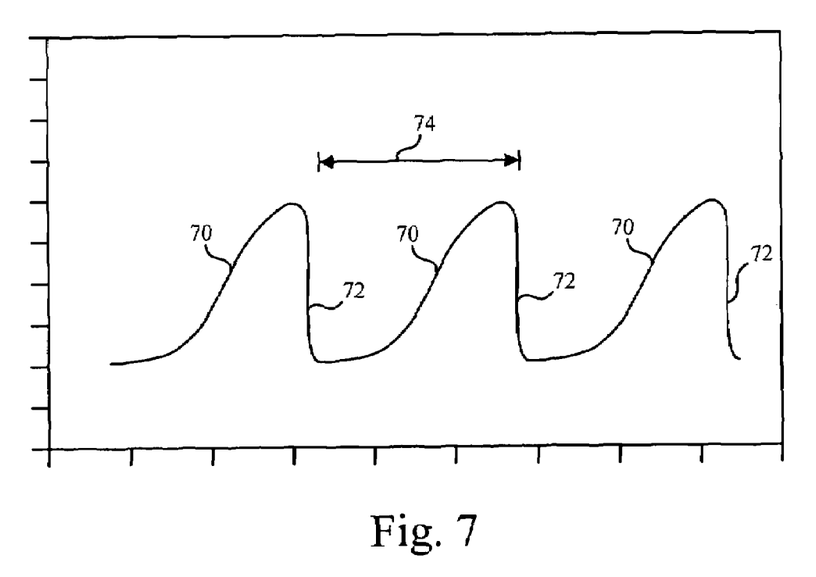
FIG. 7 is a graph representing the output of the sensor in conjunction with the target of FIG. 6, in accordance with the present invention.

Referring to FIG. 6, in some embodiments, multiple targets 12 may be used arranged in series along the direction of travel 18. The output of such a target configuration is illustrated in FIG. 7. An onboard computer may interpret the output by counting the number of sloped regions 70 and substantially vertical regions 72 to determine both the direction of travel and the distance traveled. Within a single period 74 the onboard computer may determine the position of the target 12 as for a single target 12.

Figure 8:
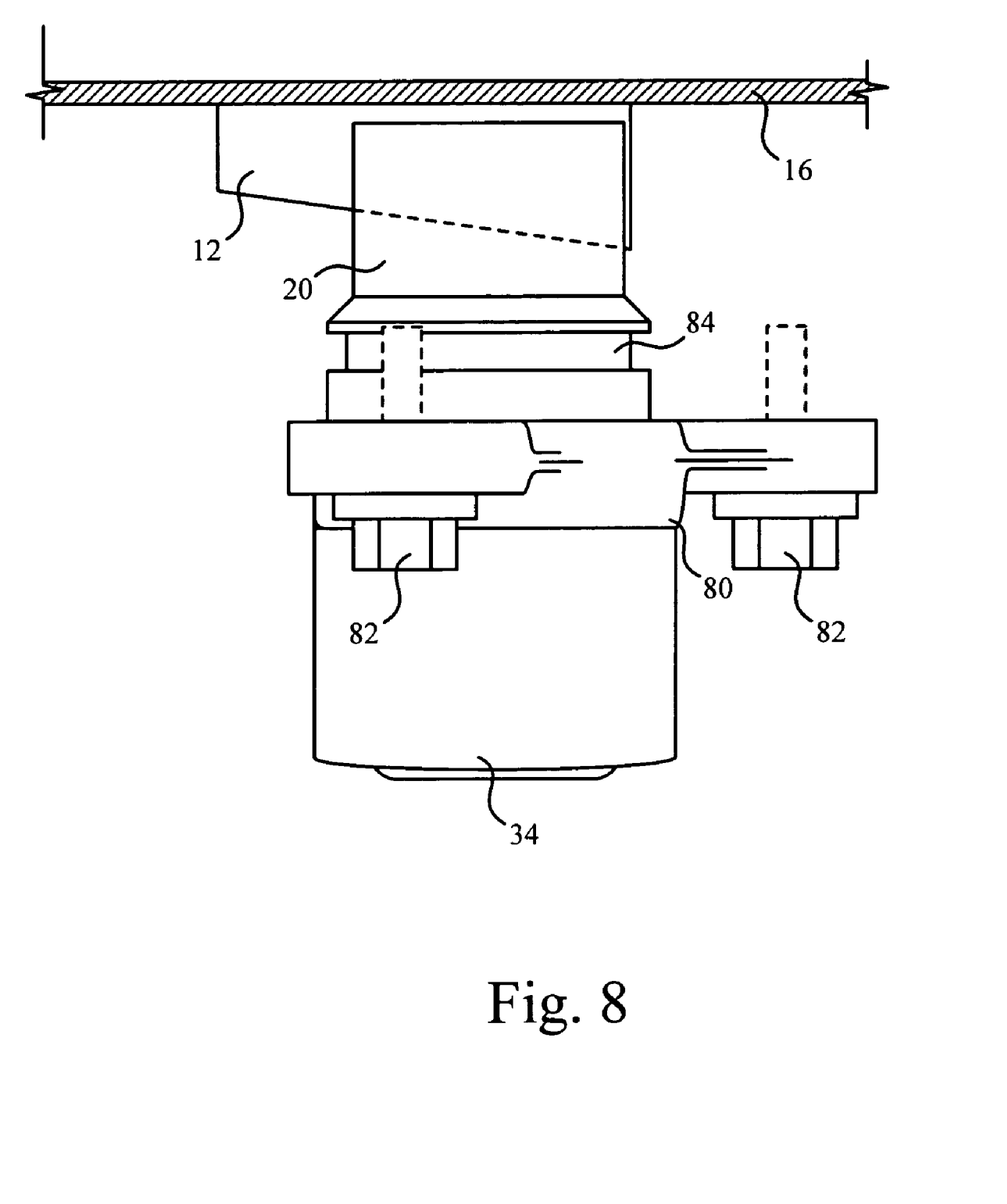
FIG. 8 is a side view of mounting system for a sensor and target, in accordance with the present invention.

Referring to FIG. 8, the transducer 14 may secure to a flange 80 receiving one or more fasteners 82, such as cap screws. The fasteners 82 may secure the flange 80 to a stationary member such as the automobile body, engine structure, or EGR valve housing, or to a bracket or the like structure secured to a stationary member. A groove 84 or gland 84 may be formed at the base of the housing 20 to receive an O-ring, sealing the gap between the base of the housing 20 to the flange 80, thereby preventing the entry of contaminants into the housing 20. The connector 34 may extend from the flange opposite housing 24 and secure to a wiring harness or the like.

Figure 9:
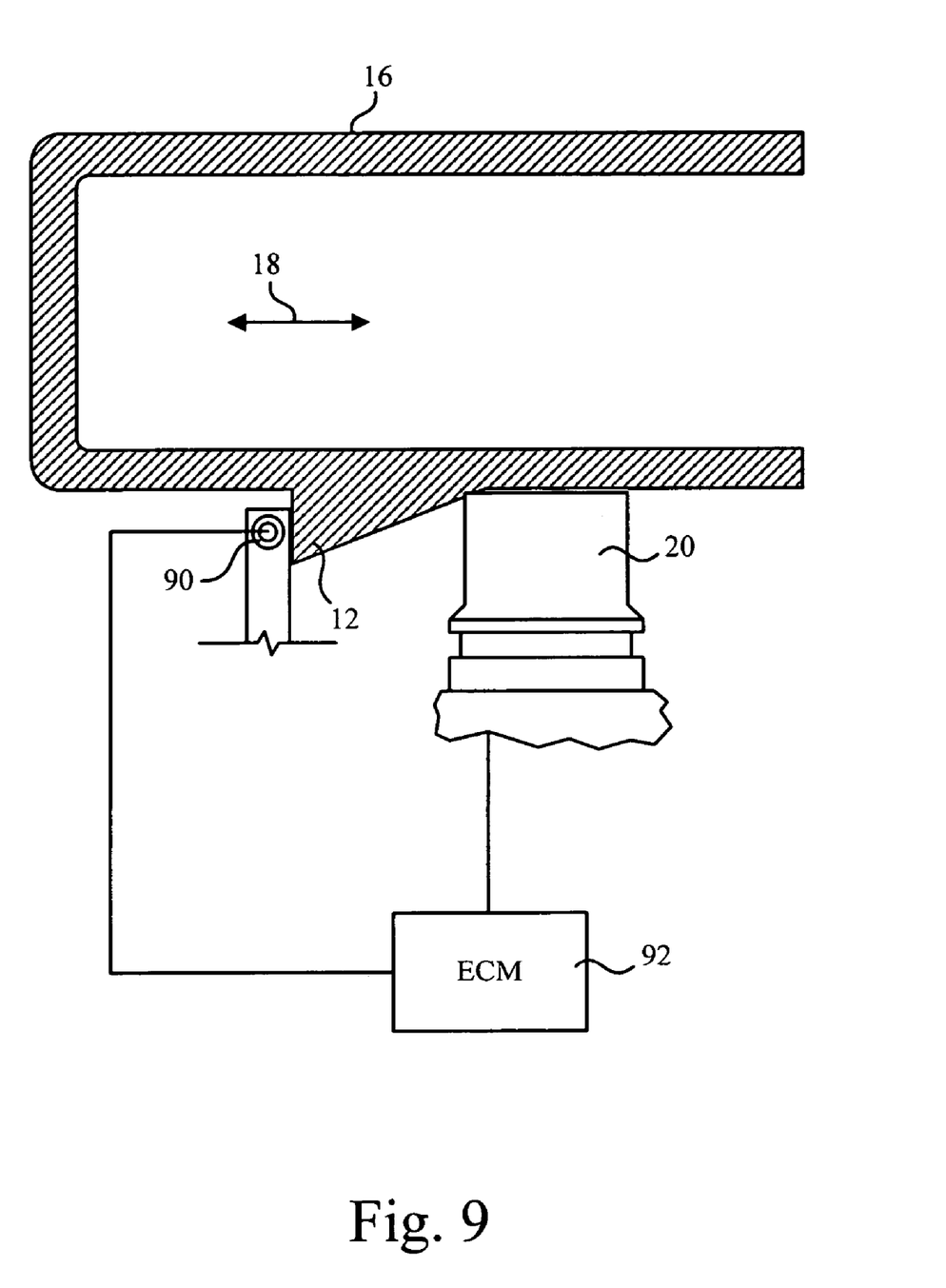
FIG. 9 is a side view of a sensor and target system incorporating a calibration switch, in accordance with the present invention.

Referring to FIG. 9, in some embodiments, calibration maybe facilitated by a reference position switch 90. A reference position switch 90 may be positioned at the end points of the range of travel of the active member 16, as in the illustrated embodiment. Alternatively, the reference position switch 90 may be placed at another position along the range of travel. The switch 90 may be activated by the target 14 as illustrated in FIG. 9. Alternatively, a separate structure may secure to the active member 16 and activate the switch 90. The switch 90 may be electrically coupled to the ECM 92, or other on-board computer.

The ECM may use the output of the switch 90 to calibrate the sensor 10. As shown in FIG. 5, the output of the sensor 10 is nonlinear. Accordingly, in order to compensate for nonlinearity computationally, the position on the curve must be known. A reference position switch may serve to establish a location on the curve 60. In other embodiments, the switch may indicate that the active member is at the beginning of its range of travel. The ECM 92 may also use the known position of the switch 90 to determine an offset to add to or subtract from output of the sensor 10 to compensate for any nonzero output of the sensor 10 at a position resulting from drift or other sources of bias.

Figure 10:
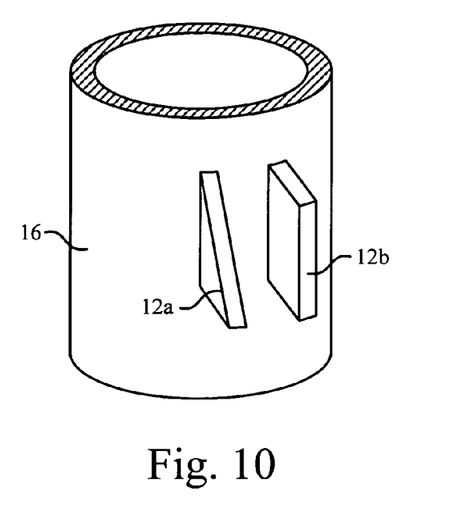
FIG. 10 is a perspective view of a dual target system, in accordance with the present invention.

Referring to FIG. 10, in some embodiments of the sensor 10, multiple targets 12a, 12b are used to compensate for movement in orthogonal directions 54, 56 as well as for drift due to changes in temperature and other environmental effects. The target 12a may have a varied flux modulating property, such as a varied reluctance along the distance of travel 18, as discussed hereinabove. The target 12b may have a constant, or substantially constant, flux modulating property along the distance of travel 18.

Figure 11:
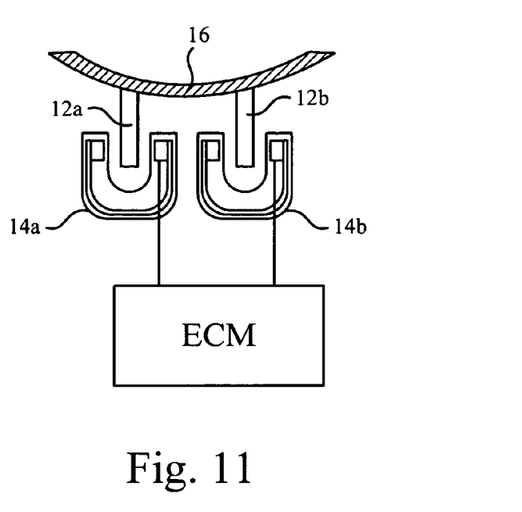
FIG. 11 is a top view of a dual target system and corresponding sensors, in accordance with the present invention.

Referring to FIG. 11, multiple transducers 14a, 14b, corresponding to the targets 12a, 12b, respectively, may be secured proximate the active member 16 having their gaps 26 positioned to interact with the targets 12a, 12b. The transducer 14b may provide a constant output signal, other than for variations due to drift and movement in orthogonal directions 54, 56. Accordingly, the signal of 14b may be used by the ECM 92 to normalize the output of transducer 14a to compensate for such anomalies.

Figure 12:
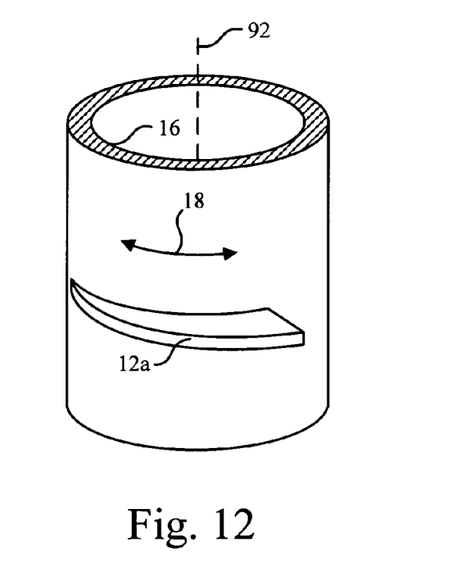
FIG. 12 is a perspective view of a target suitable for use in a rotary position sensor, in accordance with the present invention.
Figure 13:
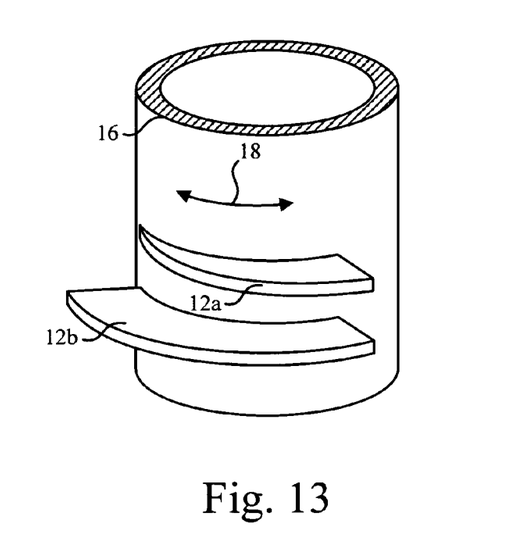
FIG. 13 is a perspective view of a dual target system suitable for use in a rotary position sensor, in accordance with the present invention.

Referring to FIG. 12, in some embodiments the direction of travel 18 may be rotational rather than translational. In such embodiments, the target 12 may have a flux modulating property varying with change in angle about an axis of rotation 92. Where the flux modulating property is reluctance as determined by the cross section of the target 12, the height 40 of the target may vary with change in angular position. A target 12 may be embodied as a target 12a used in conjunction with a reference target 12b to compensate for movement other than along the direction of travel and for drift.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting movement of a target, the apparatus comprising:
    a flux concentrator comprising a material of high magnetic permeability, the flux concentrator shaped to provide a magnetic gap comprising a region of high magnetic reluctance;
    a permanent magnet coupled to the flux concentrator and configured to establish a magnetic field across the magnetic gap;
    a magnetic sensor positioned to measure the magnetic flux across the magnetic gap; and
    a target configured to travel through the magnetic gap and modulate the reluctance across the magnetic gap in response to a change in travel distance.

2. The apparatus of claim 1, wherein the magnetic field sensing device is a Hall-effect device.

3. The apparatus of claim 1, wherein the target is formed of a low reluctance material.

4. The apparatus of claim 3, wherein the amount of low reluctance material constituting the target varies monotonically in at least one direction.

5. An apparatus for detecting movement, the apparatus comprising:
an active member;
a guide secured to the active member to permit motion thereof in a direction of travel;
a target extending along the active member substantially parallel to the direction of travel and having a cross section varying along a direction perpendicular to the direction of travel;
a magnetic field sensing device secured to the support having an output line; and
at least one magnetic flux source secured to the support positioned relative to the magnetic field sensing device to impose a magnetic flux thereon, the target positioned relative to the magnetic field sensing device and the at least one magnetic flux source to interfere with the imposition of flux on the magnetic field sensing device.

6. The apparatus of claim 5, wherein the direction of travel is rotational, the cross section varying in the radial direction relative to an axis of rotation of the direction of travel.

7. The apparatus of claim 5, wherein the magnetic field sensing device is a Hall-effect device.

8. The apparatus of claim 5, wherein the at least one magnetic flux source is a permanent magnet.

9. The apparatus of claim 5, wherein the direction of travel is translational.

10. The apparatus of claim 9, wherein the cross section varies monotonically.

11. A method for measuring displacement, the method comprising:
providing an active member;
providing a target coupled to the active member to move in correspondence therewith, the target having a flux modulating property, the flux modulating property varying along at least one dimension of the target;
providing a magnetic field sensing device;
providing a magnetic flux source positioned relative to the magnetic field sensing device to impose a magnetic flux thereon, the target positioned relative to the magnetic field sensing device and magnetic flux source to interfere with the imposition of flux on the magnetic field sensing device;
moving the active member an indeterminate amount; and
measuring variation in the stimulation of the magnetic field sensing device to determine movement of the target.

12. The method of claim 11, further comprising:
providing a second magnetic field sensing device secured to the support;
providing a second target having a flux modulating property, the flux modulating property being substantially constant along at least one dimension of the second target, the second target coupled to the active member and constrained to move in substantial correspondence therewith, the target positioned relative to the second magnetic field sensing device and one of the at least one magnetic flux sources to interfere with the imposition of flux on the second magnetic field sensing device; and
normalizing the output of the first magnetic field sensing device using the output of the second magnetic field sensing device.

13. The method of claim 11, further comprising:
providing a control unit electrically coupled to the magnetic field sensing device to measure an output signal therefrom.

14. The method of claim 13, further comprising:
providing a base position sensor proximate the target and electrically coupled to the control unit, the sensor positioned to engage at least one of the active member and the target at at least one point along a range of motion thereof;
moving the active member to bring at least one of the active member and the target into engagement with the base position sensor to cause activation thereof; and
calibrating the control unit upon activation of the base position sensor.

15. An EGR position sensor, the sensor comprising:
an EGR valve comprising
a cylinder secured to the vehicle, and
a plunger positioned within the cylinder and slidable in a longitudinal direction in relation thereto;
a target coupled to the plunger and constrained to move in correspondence thereto, the target having a cross section varying with change in position along at least one direction;
a magnetic field sensing device secured to the vehicle; and
a magnetic flux source secured to the vehicle proximate the magnetic field sensing device to impose a magnetic flux thereon, the target positioned relative to the magnetic field sensing device and magnetic flux source to interfere with the imposition of flux on the magnetic field sensing device.

16. The apparatus of claim 15, wherein the target secures to the plunger, extending longitudinally therealong.

17. The apparatus of claim 15, wherein the cross section varies monotonically in a radial direction.

18. The apparatus of claim 15, wherein the magnetic field sensing device is a Hall-effect device.

19. The apparatus of claim 15, further comprising an emission control module electrically coupled to the magnetic field sensing device.

20. An apparatus for detecting movement, the apparatus comprising:
an active member;
at least one magnetic flux source;
a first and a second magnetic field sensing device, each positioned relative to one of the at least one magnetic flux sources to sense magnetic flux produced thereby;
a first and a second target having a flux modulating property, the flux modulating property varying along at least one dimension of the target, the target coupled to the active member and constrained to move in substantial correspondence therewith, the first target positioned relative to the first magnetic field sensing device to modulate the imposition of flux thereon, the second target positioned relative to the second magnetic field sensing device to modulate the imposition of flux thereon;
a control unit electrically coupled to the first and second magnetic field sensing devices, the control unit configured to compare signals from the first and second magnetic field sensing devices to perform error correction.

21. The apparatus of claim 20, wherein the target is formed of low reluctance material and wherein the flux modulating property is the amount of low reluctance material constituting the target.

22. The apparatus of claim 21, wherein the amount of low reluctance material constituting the target varies monotoni cally with change in position parallel to the at least one dimension of the target.

23. The apparatus of claim 22, wherein the first and second magnetic field sensing devices are Hall-effect devices.

24. The apparatus of claim 23, wherein the at least one magnetic flux source is a permanent magnet.

25. The apparatus of claim 24, comprising at least one flux concentrator coupling the at least one permanent magnet to at least one of the first and second magnetic field sensing devices.

* * * * *